(12) United States Patent
Coviello et al.

(10) Patent No.: US 11,785,065 B2
(45) Date of Patent: Oct. 10, 2023

(54) DYNAMIC MICROSERVICE INTERCOMMUNICATION CONFIGURATION

(71) Applicant: NEC Laboratories America, Inc., Princeton, NJ (US)

(72) Inventors: Giuseppe Coviello, Robbinsville, NJ (US); Kunal Rao, Monroe, NJ (US); Wang-Pin Hsiung, Santa Clara, CA (US); Oliver Po, San Jose, CA (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/720,776

(22) Filed: Apr. 14, 2022

(65) Prior Publication Data

US 2022/0337644 A1 Oct. 20, 2022

Related U.S. Application Data

(60) Provisional application No. 63/175,066, filed on Apr. 15, 2021.

(51) Int. Cl.
*H04L 65/60* (2022.01)
(52) U.S. Cl.
CPC .................... *H04L 65/60* (2013.01)
(58) Field of Classification Search
None
See application file for complete search history.

(56) References Cited

U.S. PATENT DOCUMENTS

| 2015/0058444 | A1* | 2/2015 | Willmann | G06F 9/545 |
| | | | | 709/217 |
| 2019/0179663 | A1* | 6/2019 | Xu | G06F 9/4806 |
| 2020/0050494 | A1* | 2/2020 | Bartfai-Walcott | G06F 9/5061 |
| 2020/0076912 | A1* | 3/2020 | Cortes | G06F 9/544 |
| 2020/0327416 | A1* | 10/2020 | Baker | G06N 3/044 |
| 2020/0329114 | A1* | 10/2020 | Bahl | G06N 3/006 |
| 2022/0094766 | A1* | 3/2022 | Ki | H04L 12/40013 |
| 2022/0271999 | A1* | 8/2022 | Jeong | H04L 41/16 |

(Continued)

OTHER PUBLICATIONS

Magableh et al. "A Deep Recurrent Q Network towards Self-adapting Distributed Microservices architecture", arxiv.org, Jan. 15, 2019 [retrieved on Mar. 5, 2023]. Retrieved from the Internet: <URL: https://arxiv.org/pdf/1901.04011.pdf>. (Year: 2019).*

(Continued)

*Primary Examiner* — Kevin T Bates
*Assistant Examiner* — Dae Kim
(74) *Attorney, Agent, or Firm* — Joseph Kolodka

(57) ABSTRACT

Methods and systems for managing communications include identifying a system condition in a distributed computing system comprising a first microservice in communication with a second microservice. A communications method is identified responsive to the identified system condition using a reinforcement learning model that associates communication methods with system conditions. The identified communications method is implemented for communications between the first microservice and the second microservice, such that the first microservice and the second microservice use the identified communications method to transmit data.

18 Claims, 6 Drawing Sheets

(56) References Cited

U.S. PATENT DOCUMENTS

2022/0345376 A1* 10/2022 Sawabe ............... H04L 41/0823
2022/0385543 A1* 12/2022 Villasante Marcos .......................
                                                          H04L 43/08

OTHER PUBLICATIONS

Panjwani. "How to Make Microservices Communicate", DZone. com, Jan. 14, 2021 [retrieved on Mar. 6, 2023]. Retrieved from the Internet: <URL: https://dzone.com/articles/how-to-make-microservices-communicate>. (Year: 2021).*

Yang et al. "MIRAS: Model-based Reinforcement Learning for Microservice Resource Allocation over Scientific Workflows", 2019 IEEE 39th ICDCS, Jul. 7, 2019, pp. 122-132. DOI: 10.1109/ICDCS. 2019.00021. (Year: 2019).*

Dragoni et al., "Microservices: yesterday, today, and tomorrow," Present and ulterior software engineering, Jun. 2016, pp. 195-196.

Rensin et al., "Scheduling the Future at Cloud Scale" [Online]. Available: http://www.oreilly.com/webops-perf/free/kubernetes. csp, Sep. 2015, pp. 1-33.

Wiering et al., "Fast Online Q", Machine Learning 33, https://link. springer.com/article/10.1023/A:1007562800292, Oct. 1998, pp. 105-115.

The ZeroMQ authors, "ZeroMQ, An open-source universal messaging library", https://zeromq.org/, Retrieved Apr. 2022, available at least as early as Mar. 2021.

gRPC Authors, "gRPC: A high performance, open source universal RPC framework", https://grpc.io/, Retrieved Apr. 2022, available at least as early as Mar. 2021.

NATS Authors, "NATS: Connective Technology for Adaptive Edge & Distributed System", https://nats.io/, Retrieved Apr. 2022, available at least as early as Mar. 2021.

* cited by examiner

DYNAMIC MICROSERVICE INTERCOMMUNICATION CONFIGURATION

RELATED APPLICATION INFORMATION

This application claims priority to U.S. Patent Application No. 63/175,066, filed on Apr. 15, 2021, incorporated herein by reference in its entirety.

BACKGROUND

Technical Field

The present invention relates to distributed computing and, more particularly, to communications between microservices.

Description of the Related Art

Microservices are independently deployable services with an automated deployment mechanism, where each in a larger system can be independently updated, replaced, and scaled. The interconnection of microservices can use any of a variety of forms of communication, with certain communication forms being better suited to particular conditions than others.

SUMMARY

A method for managing communications includes identifying a system condition in a distributed computing system comprising a first microservice in communication with a second microservice. A communications method is identified responsive to the identified system condition using a reinforcement learning model that associates communication methods with system conditions. The identified communications method is implemented for communications between the first microservice and the second microservice, such that the first microservice and the second microservice use the identified communications method to transmit data.

A method for face detection includes identifying a system condition in a distributed computing system comprising a first microservice in communication with a second microservice in a video processing workload. A communications method is identified responsive to the identified system condition using a reinforcement learning model that associates communication methods with system conditions. The identified communications method is implemented for communications between the first microservice and the second microservice, such that the first microservice and the second microservice use the identified communications method to transmit data. A face is detected in a video stream that is processed by the video processing workload. A security action is performed responsive to detection of the face.

A system for managing communications includes a hardware processor and a memory that includes a computer program. When executed by the hardware processor, the computer program causes the hardware processor to identify a system condition in a distributed computing system comprising a first microservice in communication with a second microservice, to identify a communications method responsive to the identified system condition using a reinforcement learning model that associates communication methods with system conditions, and to implement the identified communications method for communications between the first microservice and the second microservice, such that the first microservice and the second microservice use the identified communications method to transmit data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

An application may be formed by the interconnection of multiple microservices, such that the output of a first microservice becomes the input to a second microservice. Multiple such interconnected microservices can form a chain to generate the application's functionality. This interconnection makes use of data communications between microservices, and exemplary types of communication include point-to-point, m-servers-to-n-clients, broker-based, and shared-memory-based communications.

Each communication method is best suited to a different set of conditions. The current conditions for a distributed computing system can be assessed, making it possible to dynamically configure the inter-service communications for a running application. While some distributed computing platforms make it possible to specify communication methods in a static fashion, these systems may not provide the ability to change that specified communication method as conditions change.

A communication-controller may therefore collect performance and communication-related statistics from individual microservices. These statistics may be processed using reinforcement learning to identify the optimal communications method to be used between any pair of microservices. The optimal communications method may then be applied dynamically to improve the overall application efficiency at runtime. State-action-reward-state-action (SARSA) reinforcement learning may be used in particular to adapt to changing conditions.

Figure 1:
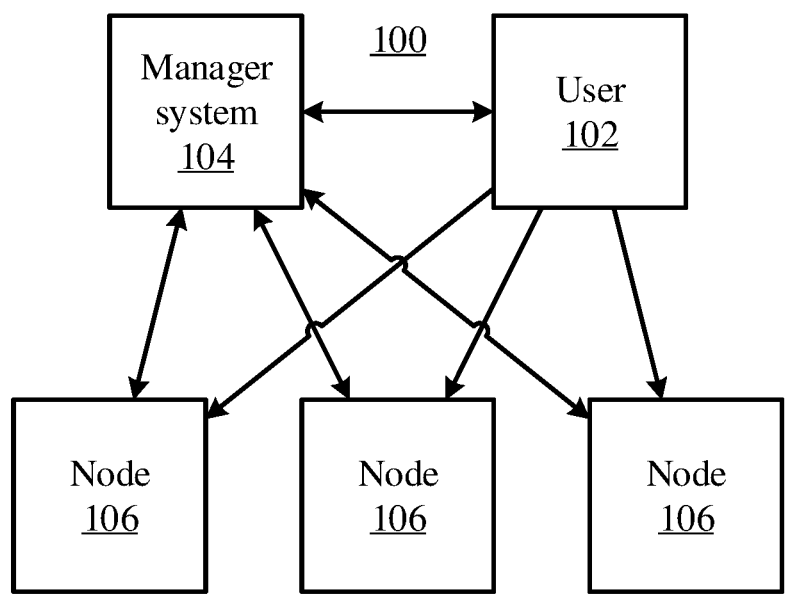
FIG. 1 is a block diagram illustrating an exemplary distributed computing system in accordance with an embodiment of the present invention.

Referring now to FIG. 1, a diagram of a distributed computing system 100 is shown. A user 102 may execute a workload the distribution computing system 100. To this end, the user 102 communicates with manager system 104. The user 102 supplies information regarding the workload, including the number and type of processing nodes 106 that will be needed to execute the workload.

The information provided to the manager system 104 includes, for example, a number of processing nodes 106, a processor type, an operating system, an execution environment, storage capacity, random access memory capacity, network bandwidth, and any other points that may be needed for the workload. The user 102 can furthermore provide images or containers to the manager system 104 for storage in a registry there.

The distributed computing system 100 may include many thousands of processing nodes 106, each of which can be idle or busy in accordance with the workloads being executed by the distributed computing system 100 at any given time. Although a single manager system 104 is shown, there may be multiple such manager systems 104, with multiple registries distributed across the distributed computing system 100.

Before and during execution of the workload, the manager system 104 determines which processing nodes 106 will implement the microservices that make up the corresponding application. The manager system 104 may configure the processing nodes 106, for example based on node and resource availability at the time of provisioning. The microservices may be hosted entirely on separate processing nodes 106, or any number of microservices may be collocated at a same processing node 106. The manager system 104 and the distributed computing system 100 can handle multiple different workloads from multiple different users 102, such that the availability of particular resources will depend on what is happening in the distributed computing system 100 generally.

Provisioning, as the term is used herein, refers to the process by which resources in a distributed computing system 100 are allocated to a user 102 and are prepared for execution. Thus, provisioning includes the determinations made by the manager system 104 as to which processing elements 106 will be used for the workload as well as the transmission of images and any configuration steps that are needed to prepare the processing nodes 106 for execution of the workload. The configuration may include, for example, identifying communications methods to be used by the microservices.

Figure 2:
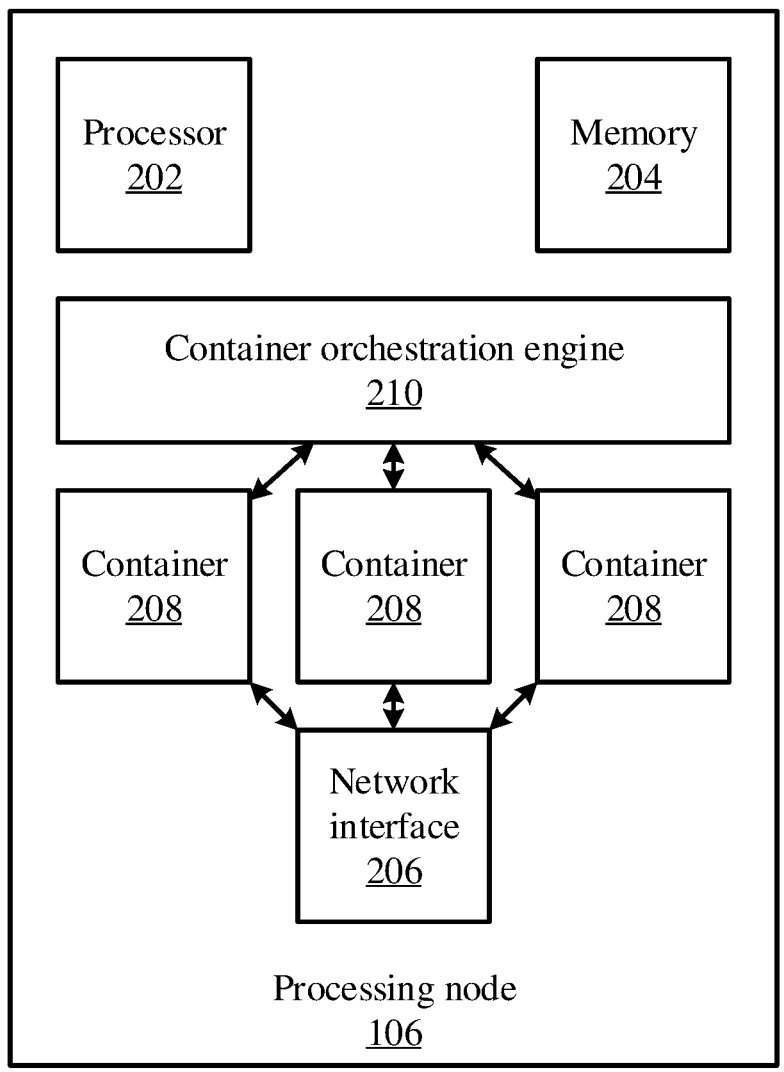
FIG. 2 is a block diagram of a processing node in a distributed computing system in accordance with an embodiment of the present invention.

Referring now to FIG. 2, additional detail on a processing node 108 is shown. The processing node 106 includes a hardware processor 202, a memory 204, and a network interface 206. The network interface 206 may be configured to communicate with the manager system 104, with the user 102, and with other processing nodes 106 as needed, using any appropriate communications medium and protocol. The processing node 106 also includes one or more functional modules that may, in some embodiments, be implemented as software that is stored in the memory 204 and that may be executed by the hardware processor 202. In other embodiments, one or more of the functional modules may be implemented as one or more discrete hardware components in the form of, e.g., application-specific integrated chips or field programmable gate arrays.

The processing node 106 may include one or more containers 208. It is specifically contemplated that each container 208 represents a distinct operating environment. The containers 208 each include a set of software applications, configuration files, workload datasets, and any other information or software needed to execute a specific workload. These containers 208 may implement one or more microservices for a distributed application.

The containers 208 are stored in memory 204 and are instantiated and decommissioned by the container orchestration engine 210 as needed. It should be understood that, as a general matter, an operating system of the processing node 106 exists outside the containers 208. Thus, each container 208 interfaces with the same operating system kernel, reducing the overhead needed to execute multiple containers simultaneously. The containers 208 meanwhile may have no communication with one another outside of the determined methods of communication, reducing security concerns.

Figure 3:
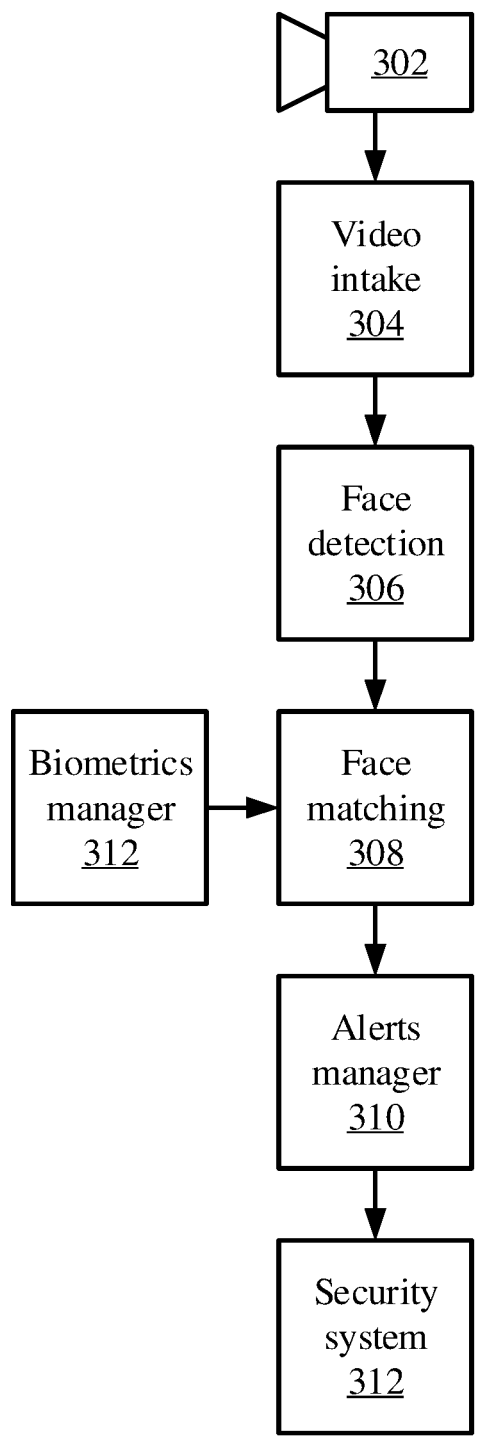
FIG. 3 is a block/flow diagram of a set of microservices in a video processing and face matching workload, in accordance with an embodiment of the present invention.

Referring now to FIG. 3, an exemplary application is shown, including a set of interconnected microservices. In this example, a video analytics application can perform real-time monitoring of a video stream, which may include monitoring a given area to determine whether specific individuals have entered the area. The video analytics application can generate an alert or automated response to the detection of such an individual.

The application may include exemplary microservices such as video intake 304, face detection 306, face matching 308, alerts manager 310, and biometrics manager 312. A camera 302 generates visual data, such as a stream of images making up a video stream. Video intake 304 processes this visual data and performs any appropriate filtering or formatting to generate frames that may be considered by downstream microservices.

Face detection 306 identifies faces within the frames of the video stream. This identification may include labeling the frame to indicate the presence of a face within the image and may further include coordinates for a bounding box of the face within the image. Face matching 308 may then connect the face image with information about a person shown in the image. This matching may draw on information from biometrics manager 312, which may store profiles of people of interest. The profile may include biometric information, such as facial features that may be used to match with face images, as well as identifying information such as the person's name and role.

In the case of a security system, a person's role may include information regarding access authorization. For example, a person may be authorized to access a restricted area, or may be specifically forbidden from entering a restricted area. The alerts manager 310 may generate an alert responsive to the detection of a person by face matching 308. For example, an alert may indicate that an authorized person is present in the area, that a forbidden person is in the area, or that an unknown person is in the area.

A security system 312 may automatically respond to the alerts. The response may include a security response, such as automatically locking or unlocking a door or other access point, sounding a visual and/or audible alarm, summoning security personnel, and requesting further authentication from the detected person.

In a distributed computing system, multiple video streams can be processed at once. For example, multiple cameras 302 may generate respective video streams, and there may be respective microservices instances of video intake 304, face detection 306, and face matching 308. Communication of detected faces between the microservices may be handled using any of a variety of different communications methods, such as an m-servers-to-n-clients process, a broker-based process, or shared memory. For example, a point-to-point communications method may be optimal when the number of faces across all cameras 302 is similar and balanced, whereas a broker-based communications method may be optimal when there are many faces being observed at certain camera angles (e.g., at the entrance to a stadium).

The various microservices may be implemented as containers 208 within a processing node 206. In some cases, multiple microservices may be implemented on a single processing node 206, for example using different respective containers 208 or by implementing multiple microservices within a single container 208. In some cases, the microservices may be implemented using multiple different processing nodes 106, with communications between the containers 208 of the different processing nodes 106 being handled over an appropriate network.

A communications controller to collect performance- and communications-related statistics from the various microservices. This communications controller may be implemented as a separate software module or as a microservice, or it may be implemented at the manager system 102. Using the collected statistics, the communications controller may use SARSA reinforcement learning to learn the characteristics of the communications between microservices and the most optimal communications method for different conditions. The communications controller can thus dynamically change the communications method being used between two microservices.

Figure 4:
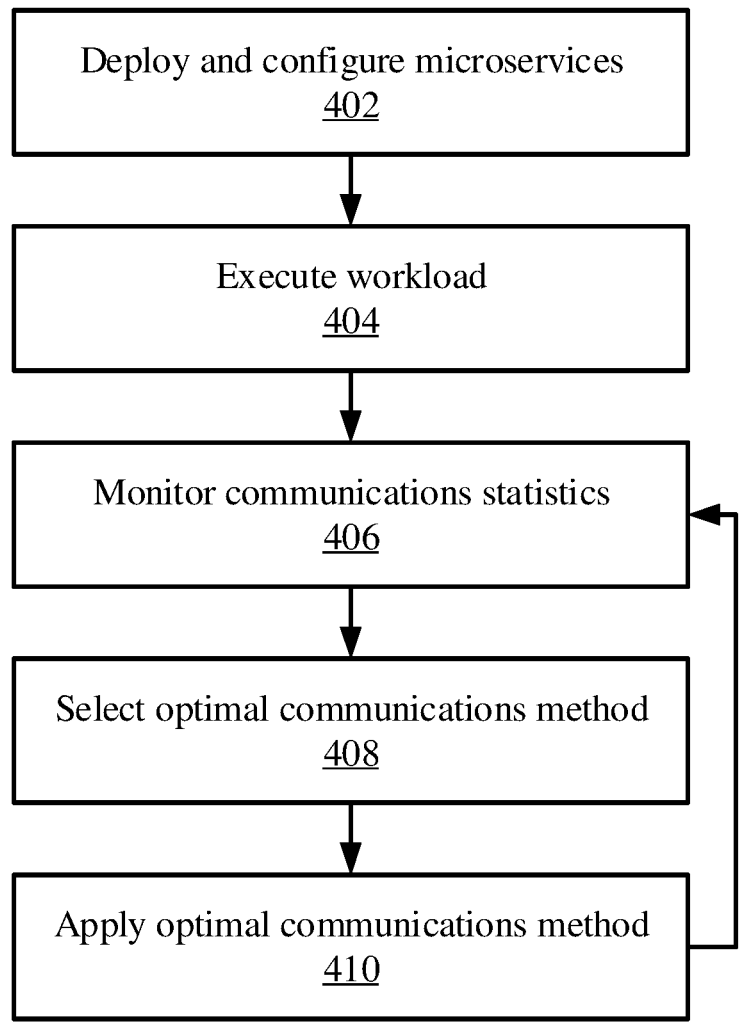
FIG. 4 is a block/flow diagram of a method for selecting an optimal communications method between microservices in a distributed computing system, in accordance with an embodiment of the present invention.

Referring now to FIG. 4, a method for dynamically adapting microservice communications during execution of a workload is shown. Block 402 deploys and configures microservices in a distributed computing system. This configuration may include an initial selection of a communications method for each respective connection between microservices.

Block 404 executes the workload using the distributed computing system. During execution of the workload, block 406 monitors communications statistics and other performance and operational parameters of the microservices. Block 408 uses the collected statistics to determine the optimal communication method for the present operational conditions. Block 410 then implements the optimal communication method by, for example, maintaining the current communications method if it is still optimal or by reconfiguring the microservices to use a new communications method if the new method has been determined to be optimal. Processing then returns to block 406, where new statistics are collected. A delay may be introduced in this update process in accordance with a configurable parameter. For example, a delay of five minutes may allow sufficient new statistics to be collected to improve the determination of whether a new communications method would be more optimal.

Types of communication statistics may include data packet-related statistics, such as minimum size, maximum size, average size, standard deviation, and frequency/rate of messages between any pair of microservices within a sliding window. Communication statistics may further include lists of communicating pairs of microservices, which may change over time, and information regarding the zone(s) and machine(s) where microservices are running. These communication statistics may determine the state for the reinforcement learning model. Performance statistics may also be collected, such as a processing rate, to determine the reward for the reinforcement learning model.

The determination of block 408 makes use of reinforcement learning. In SARSA reinforcement learning, an agent observes the current conditions (e.g., considering the collected statistics). Next, the agent selects an action using a policy, where the policy takes the current conditions as an input and generates an action that is calculated to maximize some reward. The action is performed and the results are observed, for example producing a reward or penalty. Based on this feedback, the agent updates the policy to provide better results. As this process is repeated, the agent learns the environment and what actions give maximum rewards. The agent can then use the learned policy with new inputs to guide the system's behavior.

In the context of optimizing communications between microservices, the environment may be defined as a vector that includes the following quantities:

A minimum size of data packets being exchanged between any pair of microservices within a sliding window;

A maximum size of data packets being exchanged between any pair of microservices within a sliding window;

A standard deviation of the size of data packets being exchanged between any pair of microservices within a sliding window;

A frequency of data packets between any pair of microservices within a sliding window; and A zone and processing node where the microservice is running.

The actions that an agent can take include any of the available communications methods. For example, the actions that an agent may take may include:

Use point-to-point communications;
Use m-servers-to-n-clients communications;
User broker-based communications;
Use shared-memory-based communication; and
Take no action (keep the current communication method).

The reward may be determined as a change in the processing rate of the microservices. This may be calculated as a ratio of the previous processing rate and the difference between the new processing rate and the previous processing rate:

$$r = \frac{p_{after} - p_{before}}{p_{before}}$$

In addition to the immediate reward that the agent receives for an action, the agent also considers future rewards that may result due to the current action. Accordingly, Q-values may be defined for every state and action pair. For example, Q(s,a) may be an estimate of the benefit of taking action a when in state s. The Q(s,a) estimate takes into account the future rewards that may accrue for taking the action a, as:

$$Q(s,a) \leftarrow Q(s,a) + \alpha[r + \gamma Q(s',a') - Q(s,a)]$$

where $\alpha$ is a learning rate that controls how much weight is given to new information compared to previously learned Q values and $\gamma$ is a discount factor that determines the importance of future rewards. A value of $\alpha=0$ will stop learning, while a value of $\alpha=1$ will only use the most recent information. This value may be set as a parameter with a high value (e.g., $\alpha=0.9$) in the initial deployment, or when moving to a different hardware platform, to allow the model to quickly assimilate the outcome of actions taken in the new environment. After an initial learning phase, when the Q matrix has been substantially explored, the value may be lowered (e.g., $\alpha=0.1$) to promote the use of newly assimilated information.

When $\gamma$ is zero, the agent ignores future rewards and attempts to optimize for immediate rewards. When $\gamma$ is set to one, the agent values long-term rewards highly. If an operator expects high variability in subsequent frames of the input content, the operator may encode this information by assigning a low value to γ (e.g., γ=0.1), while a higher value may be used for situations that are less variable.

Figure 5:
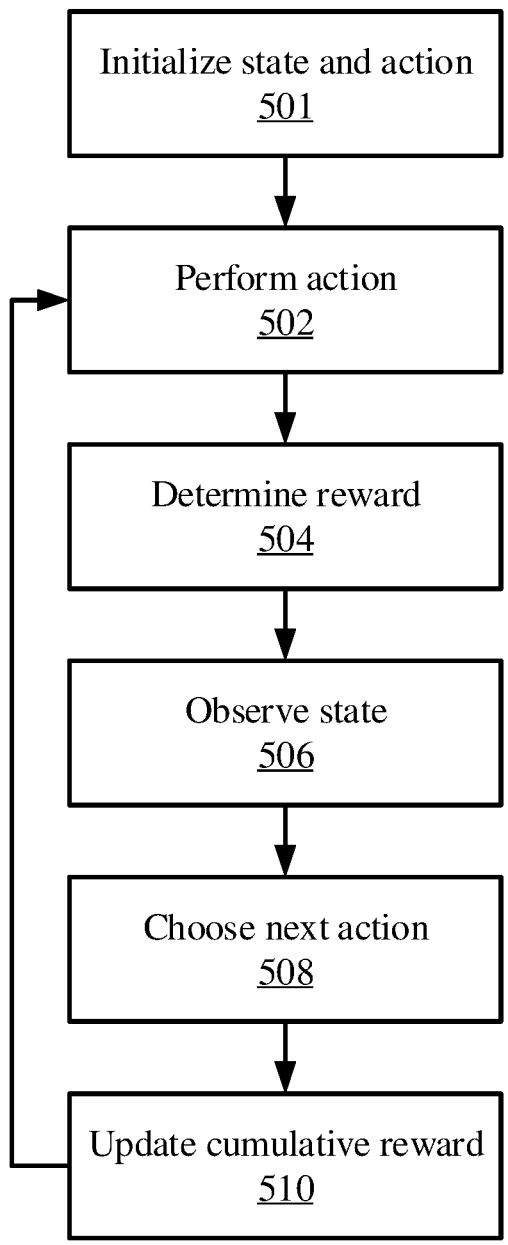
FIG. 5 is a block/flow diagram of a method for selecting communications methods based on a reinforcement learning model, in accordance with an embodiment of the present invention.

Referring now to FIG. 5, using a reinforcement learning model to determine actions is shown. Block 501 sets an initial state s and action a. An exemplary process for choosing an action will be described in greater detail below. Block 502 performs the selected action a, which changes the state from s to a new state s'. Block 504 determines a reward value r based on the new state s'.

Block 506 observes the new state s' and block 508 selects a new action a'. In the new state s', the agent assumes that an action a' will result in a Q value of Q(s', a'). The cumulative reward Q(s,a) may be estimated as described above. Block 510 updates the cumulative reward in accordance with the previous state and action (s,a) and the new state and action (s',a').

The learning process continues through operation of the system—as the agent visits and revisits states, it can update the Q matrix values to reflect current performance measurements. Early in the operation, a learning parameter is set to encourage random exploration of the state space. Later, when the Q matrix has been largely filled out, the learning parameter may be set to encourage selection of optimal states, while still allowing some learning to update values of the matrix.

This process does not define the policy for choosing the action a. Instead, it is assumed that a policy exists to ensure that all state and action pairs are visited by the agent. One way to satisfy this is to define a learning parameter ϵ. With the probability ϵ, the policy will propose the best action for the state, and with probability 1−ϵ the agent will choose a random action. During learning, the value ϵ can be assigned a small value (e.g., ϵ=0.1) to explore the state space. When a large portion of Q values have been accurately estimated, for example when a percentage of the values that is greater than a predetermined threshold has been set, higher values of E may be used so that the agent exploits the learned model. Note that, by selecting an action randomly during learning, even states that are known to perform poorly will occasionally be revisited. This allows the agent to update their reward values if performance has improved.

These Q values are estimated by the agent as part of determining the reward for taking a particular action while in a given state. This determination may take place while the agent is updating the rewards in each element of the matrix. Thus, as the system occupies a state, performance statistics may be collected, such as processing rate, to determine the reward for moving to that state. These values may be updated to reflect changing conditions, for example if the agent returns to a previously visited state and finds that the performance statistics are materially different than what was collected previously.

The Q model may be implemented as a two-dimensional matrix, with one dimension representing discretized states and the other dimension representing actions. Each element i,j of the matrix stores an expected reward for taking the action i while the system is in the state j.

When selecting an action, such as in blocks 501 or 508, a random number between zero and one may be generated and compared to E. If the random number is greater or equal to E, then a random action may be selected to further explore the environment. If the expected reward for the selected action is negative, then the agent may revert the selected action. Otherwise, the agent selects the next action to maximize the reward in its current state. However, if the predicted reward from performing the selected action is less than the reward obtained by a previous action, then the policy recommends the previous action again.

In the context of selecting communications methods, the "action" determines what communications method to use between a pair of microservices. If the agent determines that the previous communications method gives the best results, then the agent will continue to use that communications method. But when the state changes such that a new communications method provides a better expected reward, then the agent can implement the new communications method.

A variety of different conditions may cause one communication method to be preferred over another. If the output of a microservice is used by many other microservices as input, a message bus may be desired to avoid forming a separate connection between each source microservice instance and each destination microservice instance. If the messaging rates needed start to be less uniform, for example if the destination A handles five messages per second, while the destination microservice B handles thirty messages per second, it may be more efficient to use point-to-point messaging.

Figure 6:
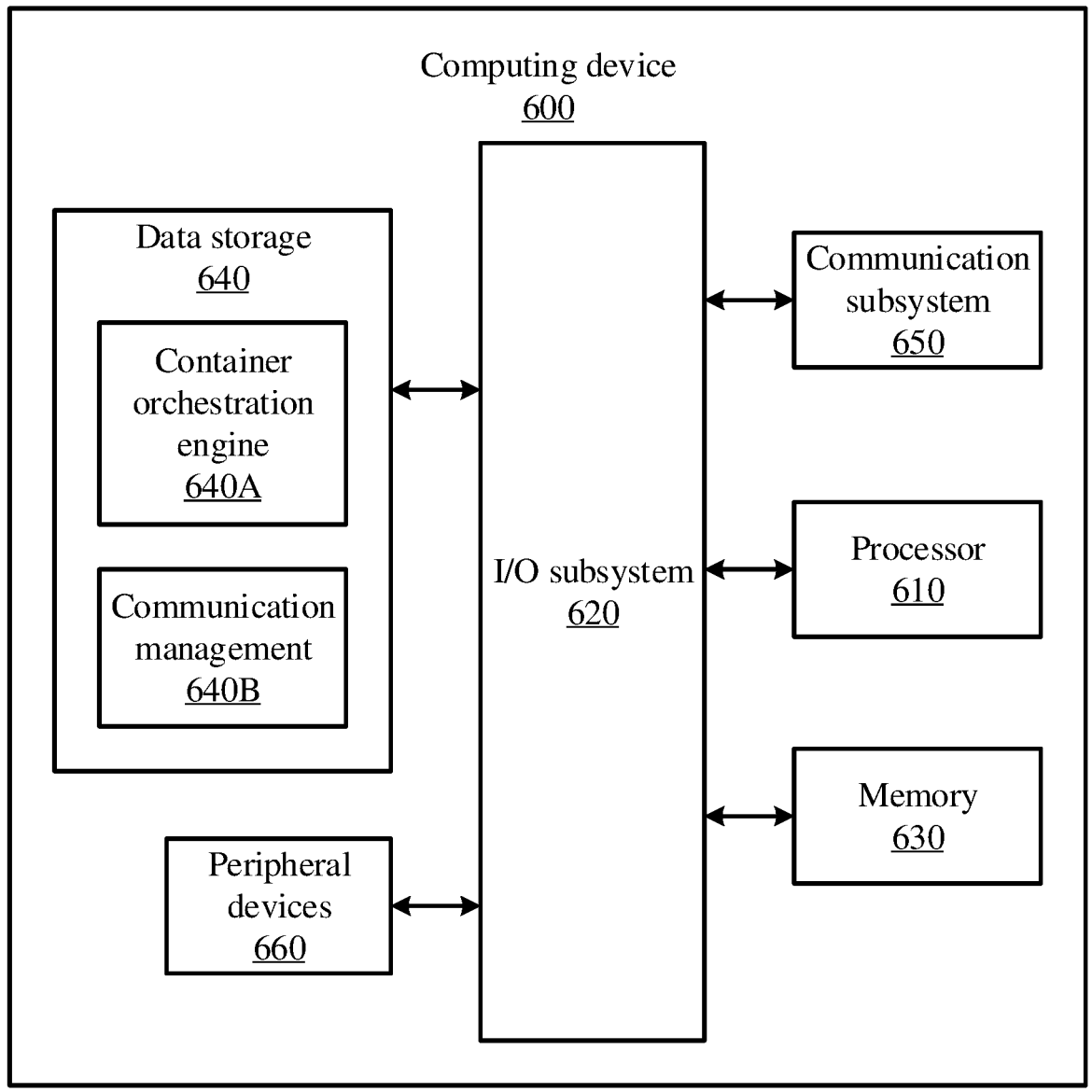
FIG. 6 is a block diagram of a computing system that can manage a distributed computing system, particularly selecting communication methods for use between microservices, in accordance with an embodiment of the present invention.

Referring now to FIG. 6, an exemplary computing device 500 is shown, in accordance with an embodiment of the present invention. The computing device 500 is configured to perform classifier enhancement.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for container orchestration and 640B for managing communications methods within a decentralized computing system. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for managing communications, comprising:
   identifying a system condition in a distributed computing system comprising a first microservice in communication with a second microservice, where the system condition includes information relating to packet size, data packet frequency, and a zone and processing node where the first microservice is running;
   identifying a communications method responsive to the identified system condition using a reinforcement learning model that associates communication methods with system conditions and that includes a reward function based on a ratio between a previous processing rate and a difference between the previous processing rate and a new processing rate, wherein the identified communications method is selected from the group consisting of an m-servers-to-n-clients process, a broker-based process, bus, and shared memory; and
   implementing the identified communications method for communications between the first microservice and the second microservice, such that the first microservice and the second microservice use the identified communications method to transmit data.

2. The method of claim 1, further comprising collecting updated system statistics after implementing the identified communications method and repeating the steps of Identifying a system condition, identifying a communications method, and implementing the identified communications method using the updated system statistics.

3. The method of claim 1, wherein identifying the communications method includes selecting between an optimal method, dictated by the reinforcement learning model, and a random method.

4. The method of claim 3, wherein selecting between the optimal method and the random method includes comparing a random value to a learning parameter.

5. The method of claim 4, further comprising updating the learning parameter, after a threshold percentage of values of the reinforcement learning model have been explored, to increase a likelihood that the optimal method is selected.

6. The method of claim 1, wherein the first microservice and the second microservice perform respective tasks in a video processing workload.

7. The method of claim 6, further comprising detecting a face in a video stream that is processed by the video processing workload and performing a security action responsive to detection of the face.

8. The method of claim 1, further comprising updating a reward value of the reinforcement learning model corresponding to the identified communications method using performance statistics collected after implementing the identified communications method.

9. The method of claim 1, wherein identifying the system condition includes measuring communication statistics including at least one of data packet-related statistics and information regarding which zones and machines the first microservice and the second microservice are running on.

10. A computer-implemented method for face detection, comprising:
   identifying a system condition in a distributed computing system comprising a first microservice in communication with a second microservice in a video processing workload, where the system condition includes information relating to packet size, data packet frequency, and a zone and processing node where the first microservice is running;
   identifying a communications method responsive to the identified system condition using a reinforcement learning model that associates communication methods with system conditions and that includes a reward function based on a ratio between a previous processing rate and a difference between the previous processing rate and a new processing rate, wherein the identified communications method is selected from the group consisting of an m-servers-to-n-clients process, a broker-based process, bus, and shared memory;
   implementing the identified communications method for communications between the first microservice and the second microservice, such that the first microservice and the second microservice use the identified communications method to transmit data;

detecting a face in a video stream that is processed by the video processing workload; and performing a security action responsive to detection of the face.

11. A system for managing communications, comprising:
a hardware processor; and
a memory that includes a computer program which, when executed by the hardware processor, causes the hardware processor to:
identify a system condition in a distributed computing system comprising a first microservice in communication with a second microservice, where the system condition includes information relating to packet size, data packet frequency, and a zone and processing node where the first microservice is running;
identify a communications method responsive to the identified system condition using a reinforcement learning model that associates communication methods with system conditions and that includes a reward function based on a ratio between a previous processing rate and a difference between the previous processing rate and a new processing rate, wherein the identified communications method is selected from the group consisting of an m-servers-to-n-clients process, a broker-based process, bus, and shared memory; and
implement the identified communications method for communications between the first microservice and the second microservice, such that the first microservice and the second microservice use the identified communications method to transmit data.

12. The system of claim 11, wherein the computer program further causes the hardware processor to collect updated system statistics after implementing the identified communications method and repeating the steps of identifying a system condition, identifying a communications method, and implementing the identified communications method using the updated system statistics.

13. The system of claim 11, wherein the computer program further causes the hardware processor to select between an optimal method, dictated by the reinforcement learning model, and a random method.

14. The system of claim 13, wherein the computer program further causes the hardware processor to compare a random value to a learning parameter to determine which communication method to use.

15. The system of claim 14, wherein the computer program further causes the hardware processor to update the learning parameter, after a threshold percentage of values of the reinforcement learning model have been explored, to increase a likelihood that the optimal method is selected.

16. The system of claim 11, wherein the first microservice and the second microservice perform respective tasks in a video processing workload.

17. The system of claim 11, wherein the computer program further causes the hardware processor to update a reward value of the reinforcement learning model corresponding to the identified communications method using performance statistics collected after implementing the identified communications method.

18. The system of claim 11, wherein the computer program further causes the hardware processor to measure communication statistics including at least one of data packet-related statistics and information regarding which zones and machines the first microservice and the second microservice are running on.

* * * * *